United States Patent [19]

Hanewinkel

[11] 4,162,519

[45] Jul. 24, 1979

[54] DATA PROCESSOR WITH ADDRESS ALLOCATION TO OPERATIONS

[75] Inventor: Lorenz Hanewinkel, Paderborn, Fed. Rep. of Germany

[73] Assignee: Nixdorf Computer AG, Paderborn, Fed. Rep. of Germany

[21] Appl. No.: 844,885

[22] Filed: Oct. 25, 1977

Related U.S. Application Data

[63] Continuation-in-part of Ser. No. 650,071, Jan. 19, 1976, abandoned.

[30] Foreign Application Priority Data

Jan. 20, 1975 [DE] Fed. Rep. of Germany ....... 2502005

[51] Int. Cl.² ............................ G06F 3/00; G06F 9/00
[52] U.S. Cl. .................................................... 364/200
[58] Field of Search ........................ 364/200 MS File

[56] References Cited

U.S. PATENT DOCUMENTS

| | | | |
|---|---|---|---|
| 3,389,376 | 6/1968 | Packard | 364/200 |
| 3,736,567 | 5/1973 | Lotan | 364/200 |
| 3,990,054 | 11/1976 | Perlowski | 364/200 |

*Primary Examiner*—Harvey E. Springborn
*Attorney, Agent, or Firm*—Marianne Rich

[57] ABSTRACT

All instruction words of a microprocessor have the same number of instruction word bits, but the number of instruction word bits constituting address bits varies as a function of the number of addresses associated with the operation specified by the operation code part of the instruction word. Operations having only one associated address have no address bits. A translator circuit has a plurality of inputs each receiving one bit of the instruction word, a set of control outputs for furnishing control signals, and a set of address outputs for furnishing address words. The set of control outputs has logic interconnections with each of the translator circuit inputs, as does the set of address outputs. Operation code bits in the instruction word are therefore also utilized as address bits, thereby decreasing the total number of instruction word bits required. For some operations, the required address is an operand stored in a memory location addressed by the operation code bits of the instruction word. This operand is read out and used as an address for the memory.

11 Claims, 9 Drawing Figures

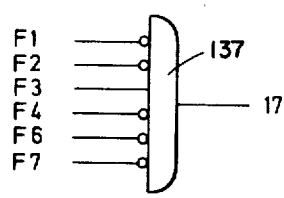
CONTROL SIGNAL 17 GENERATED IN 14    FIG. 3
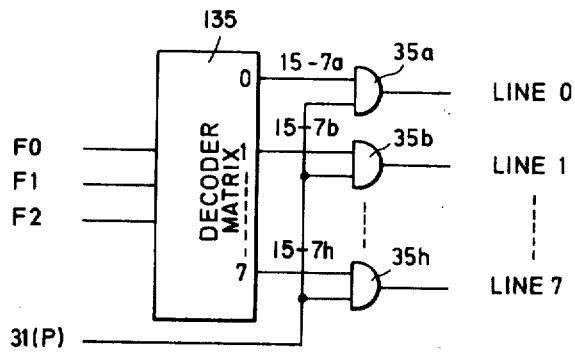
FIG. 4
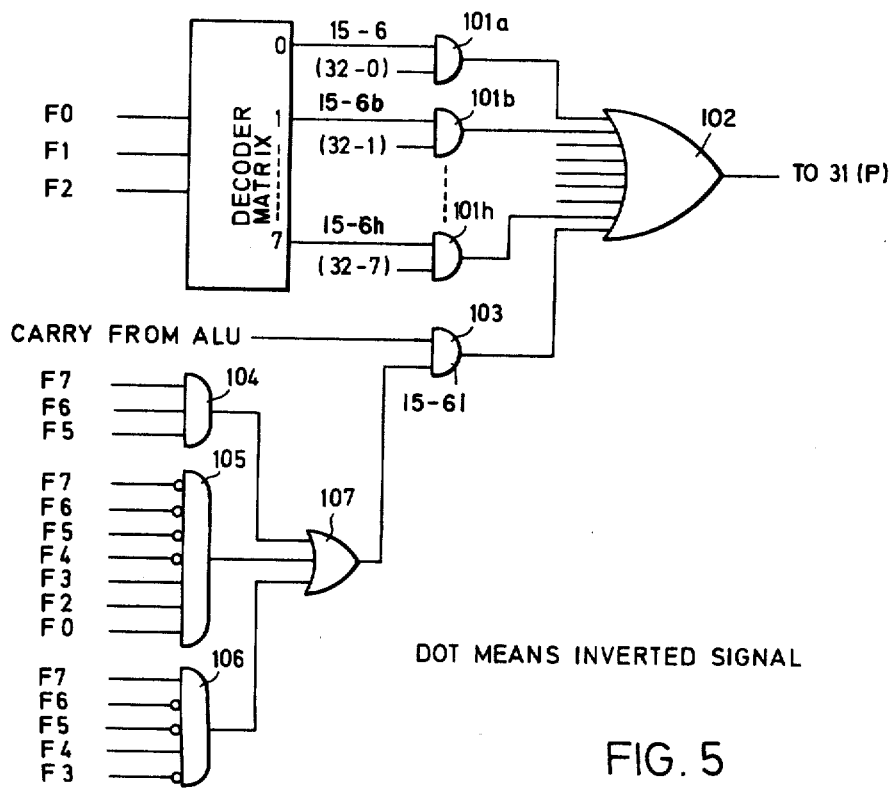
DOT MEANS INVERTED SIGNAL
FIG. 5

DATA PROCESSOR WITH ADDRESS ALLOCATION TO OPERATIONS

CROSS-REFERENCE TO RELATED APPLICATIONS

This application is a continuation-in-part application of my application "Method of Address-Allotment in Data-Processing Computers" Ser. No. 650,071, filed Jan. 19, 1976, which is now abandoned.

BACKGROUND OF THE INVENTION

This invention relates to data processing apparatus and methods. More particularily, it relates to such apparatus and methods wherein data is processed under the control of a program comprising a sequence of instruction words. The apparatus carries out the processing defined by each instruction word and then furnishes an output word, which generally constitutes the address of the next subsequent instruction word but may also comprise computed data and the address to which the computed data is to be furnished.

The output word furnished by the equipment of the present invention may also be utilized to control the operation in automated machine tool or production equipment, in data input and output devices, etc.

Data processing equipment of this type is generally known as microprocessors. These comprise a read-only memory storing the instruction words, a central processing unit, and a random access memory. Of course, additional external storages may be associated therewith.

Under modern production techniques, microprocessors generally are built as integrated circuits. In such integrated circuits the space occupied by the actual circuitry is extremely small, the overall space required by the equipment being mainly a function of the number of connections which must be made to each unit. In attempting to minimize the cost of, and the space occupied by, a microprocessor, it is therefore essential to minimize the number of external connections required, rather than the number of actual circuit components. Further of course, the microprocessor according to the present invention should be as versatile, as possible, that is, its application should not be restricted to a particular application. This requires that the output words be usable without further adaptation in a variety of external equipment.

Since the output words of apparatus of the present invention are frequently used to address one of a large number of storage locations in the external data processing system, the number of bits in the output words has to be relatively large. One possibility of furnishing long address words with relatively little equipment is to generate the first part of the address word, store this in an external register, furnish the second part of the address word, store this in another register, and then output the two parts simultaneously. This requires three or four individual steps so that a relatively long time is required for outputing such addresses. Further, an additional external register, having a number of places corresponding to the total number of bits in each output word, is required. This in turn increases the cost of such an arrangement.

One possibility of saving terminals is to use each terminal both as an input and as an output terminal. However, such arrangements have very definite drawbacks especially insofar as testing the equipment is concerned. Further, the terminals must of course be decoupled from each other which requires additional circuit elements such as diodes or transistors. Testing of the equipment must then proceed separately for the input function and the output function, thereby increasing the manufacturing time.

SUMMARY OF THE INVENTION

It is an object of the present invention to furnish an apparatus which allows relatively long output words to be furnished with a minimum of equipment. The manufacturing time, including testing of the microprocessor, is to be decreased without increasing the time required for the apparatus to furnish the output word upon receipt of the instruction word. The present invention is derived from the knowledge that in a random access memory of the microprocessor there are a large number of memory locations which are associated with a relatively small number of different, recurring operations, while a relatively small number of memory locations is associated with a relatively large number of regularly recurring different operations. It can thus be concluded that a large number of operations is associated with a small number of memory locations and vice versa. Thus instruction words which must differentiate between a great number of memory locations must have address parts which have a relatively large number of bits. These same instruction words can, however, be limited to a relatively small operation code part, since the number of operations to be controlled thereby is small. On the other hand, if only a small number of memory locations is to be addressed, the address part of the instruction word can be small, leaving, for instruction words having a fixed number of instruction word bits, a large number of bits for the operation code part. The equipment and method of the present invention is thus based on the use of instruction words having a predetermined number of bits, but having an address part with a varying number of bits and an operation code part whose number of bits varies in inverse proportion to the number of bits in the address part.

It may further be considered that some memory locations are used only in conjunction with one particular operation. In this case it is not necessary that the instruction word have any address part. The particular operation code in itself and without an address part is sufficient to specify the corresponding memory location. Thus a number of locations exist in the memory which are readily available in response to an instruction word without any intervening transport operation or other step.

The present invention is a microprocessor, which comprises an input circuit for receiving a sequence of instruction words, all having the same number of instruction word bits, at least a first selected one of said instruction words having a number of operation code bits equal in number to said number instruction word bits and no address bits, a second selected one of said instruction words having a number of operation code bits less than said number of instruction word bits, the remaining bits being address bits. The instruction words thus constitute instruction words having a fixed number of instruction word bits but a variable number of operation code bits and a correspondingly variable number of address bits. A translator circuit is connected to said input circuit and is responsive to said instruction words for furnishing a predetermined number of control signals and an address word having a predetermined number of address bits in response to each of said instruction words. A memory is provided for storing a predetermined number of operands, each in a operand memory location. An addresing circuit is interconnected between said translator circuit and said memory, for addressing a corresponding one of said memory locations in response to each of said address words. A read-out circuit is connected to said memory, for reading out the addressed memory location under control of at least one of said control signals, thereby furnishing a selected operand. Finally, an output circuit is connected to said read-out circuit for furnishing output signals corresponding to said selected operand, said output signals constituting at least part of an output address.

The present invention, both as to its construction and its method of operation, together with additional objects and advantages thereof, will best be understood from the following description of a preferred embodiment when read in connection with the accompanying drawings.

BRIEF DESCRIPTION OF THE DRAWINGS:

FIG. 3 is a logic circuit diagram of the part of translator 14 required to generate control signal 17 of FIG. 1;

FIG. 4 is a logic circuit diagram of decoder 35 and the parts of translator 14 cooperating therewith; and FIG. 5 is a logic circuit diagram of mltiplexer 30 and the parts of translator 14 cooperating therewith.

DESCRIPTION OF THE PREFERRED EMBODIMENT

Figure 1:
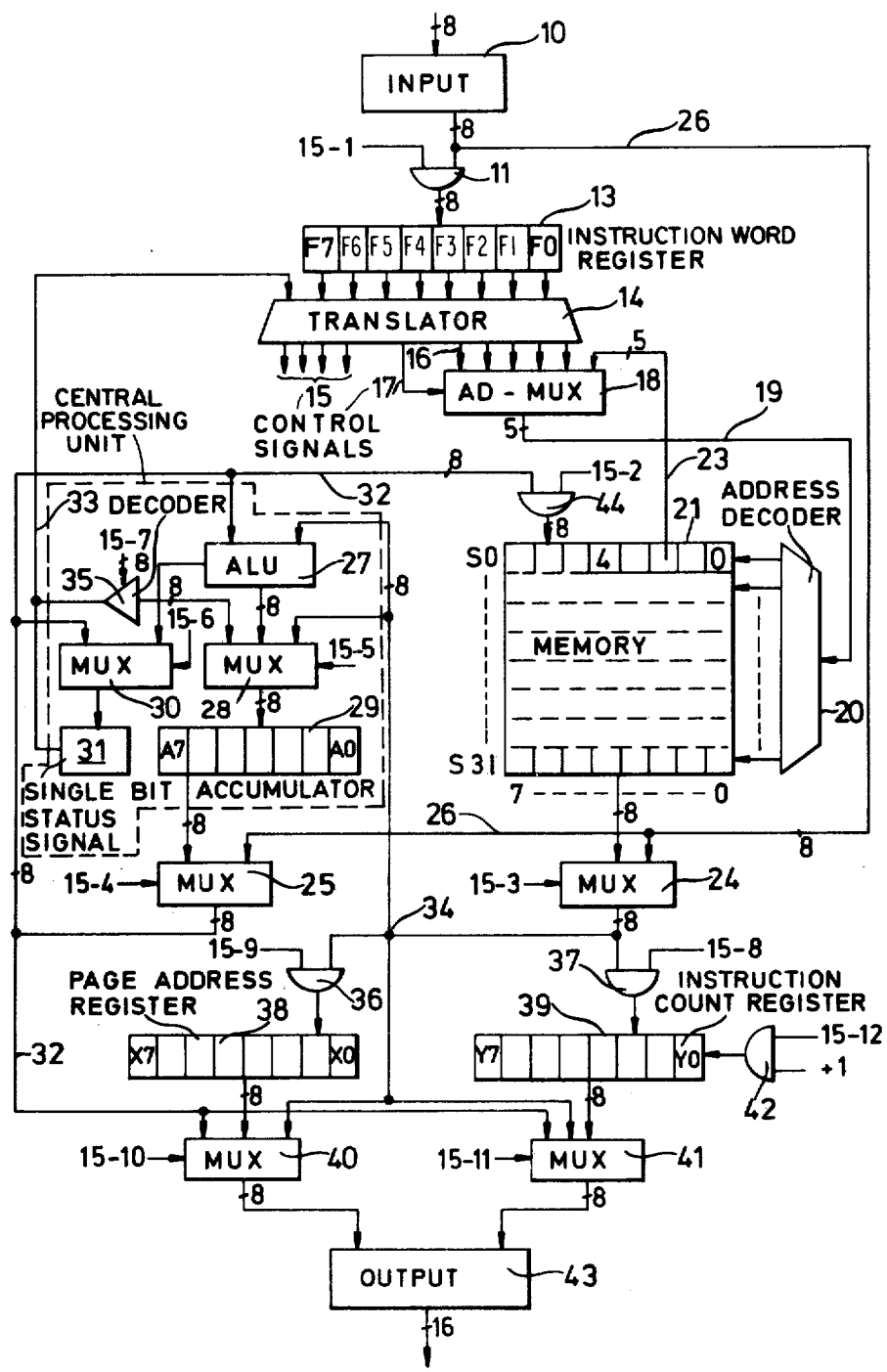
FIG. 1 is an over-all schematic diagram of the apparatus of the present invention.

Before starting the discussion of a preferred embodiment of the microprocessor of the present invention, it should be noted that it is controlled by a program having instruction words of fixed bit length, as are conventional microprocessors. However, the instruction words of the present invention do not have a predetermined number of bits assigned as address bits and a predetermined number of bits assigned to the operation code part as is the case for conventional instruction words. Any or all bits in any instruction word may be used in combination to generate both control signals (as is done by the operation code bits in conventional instruction words) and address signals (as done by address bits in conventional instruction words). Thus some instruction words may have a given number of bits used only for generating an address, but the number of such bits may change from one instruction word to the next and some instruction words have no "address" bits at all. In the last instance, all bits in the instruction word serve to generate both the control signals and the address signals.

In the text the term "control signal on line x" is occasionally abbreviated to "control signal x." No change in meaning is intended.

Further, numbers next to a dash across any line indicated in the drawing indicate the number of lines represented by the single line in the drawing. For example, the single line at the input terminal of input circuit 10 of FIG. 1 indicates that the instruction word being received has eight bits, each of which is separately furnished on an individual line. Similarly, input circuit 10 furnishes an output on eight lines. The output of the microprocessor of the present invention is a sixteen line output furnished by an output stage 43. The sixteen bit word which appears on the sixteen line output generally signifies an address for locating the next instruction word to be inputed to circuit 10, but may at times constitute the result of a computation carried out in the microprocessor, together with the address at which the result is to be stored.

Referring now to FIG. 1, the eight bit instruction word is received at eight input terminals of an input circuit 10 where any required pulse shaping or amplification takes place. The eight bit word at the output of input circuit 10 is transferred through an AND gate 11 to instruction word register 13 if AND gate 8 is not blocked by a control signal 15-1. The latter, if present, is furnished at the output of a translator 14 in response to the preceding instruction word. This will be discussed in greater detail below. Instruction word register 13 is an eight bit register comprising eight individual flip-flops F0-F7. The output of each of flip-flops F0-F7 is connected with a corresponding input of the above-mentioned translator circuit 14. The latter will be discussed in greater detail with reference to FIGS. 2–5.

It should be noted that translator 14 has a first predetermined number of output terminals (denoted by ref. numerals 15 and 17) for furnishing control signals and a second predetermined number of output terminals (ref. numeral 16), at which address bits, together constituting an address word, are furnished. The address words are furnished to an address multiplexer 18 which operates under control of control signal 17. Control signals 15 control the operation of the microprocessor as indicated in the drawing and as discussed in further detail below. Translator circuit 14 has a further input which is connected to the output of a single bit flag circuit 31 through a line 33. The type of operation controlled by flag 31 will be discussed in greater detail below. Its general purpose is to indicate the state of a particular bit in the instruction word and to control the operation of translator 14 and other circuits accordingly.

Address multiplexer 18 is connected through its five output lines 19 to an address decoder 20. A memory 21 has 32 memory locations (S0-S31) each storing an eight bit operand. The signals on the five input lines to decoder 20 are decoded therein to activate the one of its thirty-two output lines which signifies the addressed memory location. Data may be entered into memory 21 through a plurality of AND gates 44, each having a data input from one of eight lines and a control input from line 15-2 at the output of translator circuit 14. Data, such as the result of computations or auxiliary addresses, supplied from input 10 through lines 26 and multiplexer 25 is entered into the eight flip flops constituting the addressed memory location under the control of a control signal furnished by translator 14.

The computed data is generated in the central processing unit represented on the left hand side of FIG. 1. The central processing unit comprises an arithmetic logic unit 27, multiplexers 28 and 30, the single bit flag 31, and an accumulator 29.

The data output from memory 21 is furnished through eight lines to the input of a multiplexer 24, which also has a second set of data inputs for receiving the instruction word as supplied on eight output lines 26 of input circuit 10. The control as to which of the inputs is to be transferred to the output is carried out by control signals 15-3 furnished by translator 14 as described in greater detail below in conjunction with the individual instructions. A further multiplexer 25 is connected to the output of the central processing unit and more particularily, to the output of accumulator 29. Accumulator 29 is an eight bit accumulator which furnishes its output on eight lines to the data inputs of multiplexer 25. Multiplexer 25 is also connected to the output of input circuit 10 through lines 26. The control of multiplexer 25 is carried out by control signals 15-4 also furnished at the output of translator 14. The output of multiplexer 24 is an eight line output, which is applied to AND gates 37 controlled by control signals 15-8. AND gates 37 enter the signals at the eight output lines of multiplexer 24 in parallel into instruction count register 39, which is an eight bit register. The output of multiplexer 24 can also be applied via lines 34 to the inputs of AND gates 36 which feed a page address register 38 (also an eight bit register) under the control of control signals 15-9.

Instruction count register 39 has a counting input which is connected to the output of an AND gate 42. The count on instruction count register 39 can be increased by one in response to a control signalson line 15-12 at the output of translator 14.

The eight line outputs of registers 38 and 39 are applied to corresponding inputs of a multiplexer 40 and 41, respectively. Multiplexer 40 operates under control of control signals 15-10 while multiplexer 41 operates under control of control signals 15-11. Multiplexers 40 and 41 also each have inputs connected through eight lines 32 to the output of multiplexer 25, and a further set of inputs connected to the outputs of multiplexer 24 through lines 34. The eight bit output of multiplexer 40 is combined with the eight bit output of multiplexer 41 to form the sixteen bit output word in output stage 43.

As mentioned above, the central processing unit comprises the arithmetic logic unit 27, accumulator register 29, multiplexers 28 and 30 and the single bit flag 31.

A decoder 35, shown in greater detail in FIG. 4, has eight output lines (line 0 . . . line 7). It comprises eight AND gates 35a, 35b, . . . 35h, each of which receives a corresponding one of control signals 15-7a . . . 15-7h, at a first input and a flag signal at a second input. The flag signal is a "0" or a "1" signal, depending upon the state of single bit flag 31 of FIG. 1. Control signals 15-7a . . . 15-7h are furnished on eight output lines of translator 14. The eight output lines are indicated as a single line (one of lines 15) in FIG. 1 because of lack of space.

As shown in FIG. 4, bits F0, F1 and F2 of the instruction word are applied to a decoder matrix 135 which is part of translator 14 and which has eight output lines. Only one of these output lines, as determined by bits F0, F1, F2 of the instruction word, is energized. Thus, if the flag is in a "1" state, the AND gate receiving the selected line signal furnishes a "1" output; if not, none of the lines at the output of decoder 35 is energized.

The eight lines at the output of decoder 35 are applied to one set of inputs of multiplexer 28. Multiplexer 28 has a further set of inputs connected to the eight outputs of arithmetic-logic unit 27 and a still further set of inputs connected to the eight bit output of multiplexer 24. Transmission of signals through multiplexer 28 is controlled by control signals 15-5. Multiplexer 28 delivers an eight bit output which is stored in accumulator 29. The data stored in accumulator 29 represents the resultant of the operations carried out in the central processing unit and, at times, includes a bit whose state is controlled by flag 31. The arithmetic-logic unit 27 has inputs connected to the outputs of multiplexer 24 through lines 34 and inputs connected to the outputs of multiplexer 25 through lines 32. Further, arithmetic-logic unit 27 may furnish test signals or carry signals to multiplexer 30, which is controlled by control signals 15-6. Multiplexer 30 also has a set of inputs connected to the outputs of multiplexer 25 through lines 32. The output of multiplexer 30 is applied to flag 31 to control its state.

In the following, the operation of the apparatus as shown in FIG. 1 will be discussed with reference to particular instruction word inputs. It is important for all cases to be discussed, however, that address multiplexer 18 cooperates with translator 14 to generate an address which, after decoding, selects one of storage locations S0-S31 in memory 21. Even instruction words having no address part at all and specifying only an operation code suffice, since at least one predetermined memory location is assigned to each operation specified in an address-less instruction word. The logic circuits required to generate these addresses are shown in FIG. 2a–e.

Figure 2A:
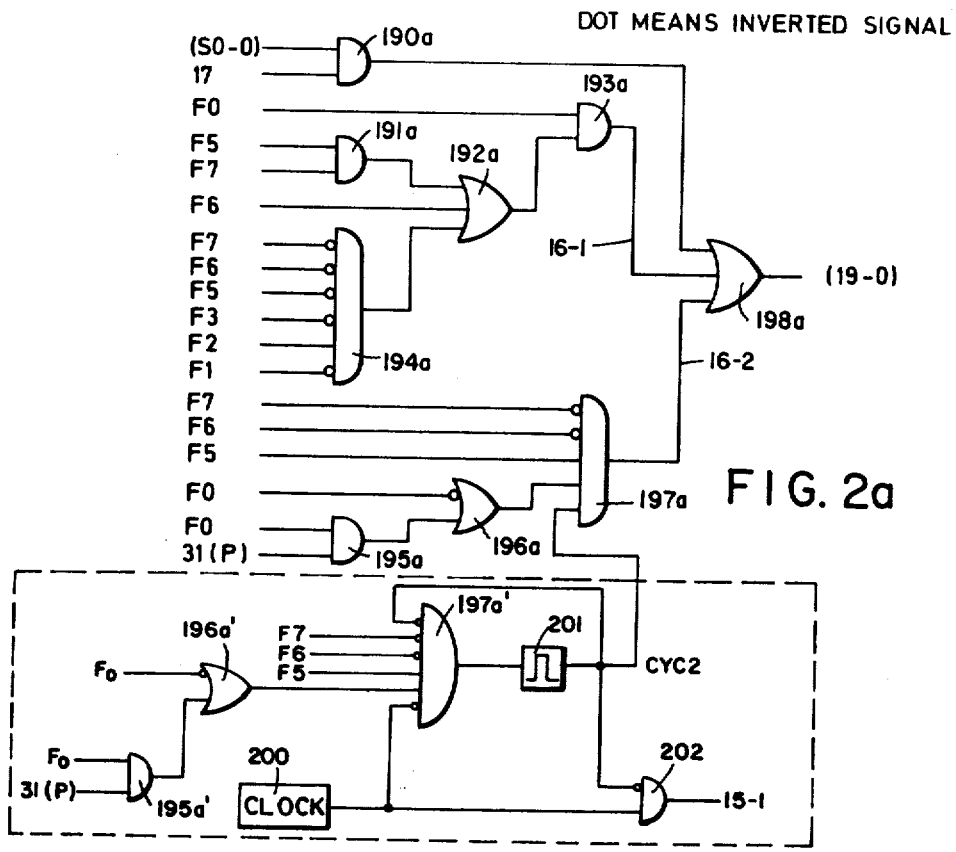
FIGS. 2a-2e are logic circuit diagrams combining address multiplexer 18 of FIG. 1 and the parts of translator 14 cooperating therewith.

FIG. 2a shows the logic circuit for generating the address bit on line 19-0. An AND gate 190a receives control signal 17 and signal S0-0. Signals F5 and F7 form the inputs for an AND gate 191a whose output is connected to one input of an OR gate 192a. The output of OR gate 192a is applied to an AND gate 193a whose other input is connected to bit F0 of instruction word register 13. A second input of OR gate 192a is connected to bit F6, while a third input is connected to the output of an AND gate 194a which has inverting inputs connected to bits F3, F5, F6, F7 and F1 and a direct input connected to bit F2. An AND gate 195a has a first input connected to bit F0 and a second input connected to the single bit flag 31. The output of AND gate 195a is connected to one input of an OR gate 196a whose second, inverting input is connected to bit F0. The output of OR gate 196a, bit F5, and signal CYC 2 are connected to direct inputs of an AND gate 197a which also has two inverting inputs connected to bits F6 and F7 respectively. The output of AND gate 197a is connected to one input of an OR gate 198a whose remaining inputs are connected to the ouput of AND gate 190a and the output of AND gate 193a. The output of OR gate 198a is the signal on line 19-0.

Figure 2B:
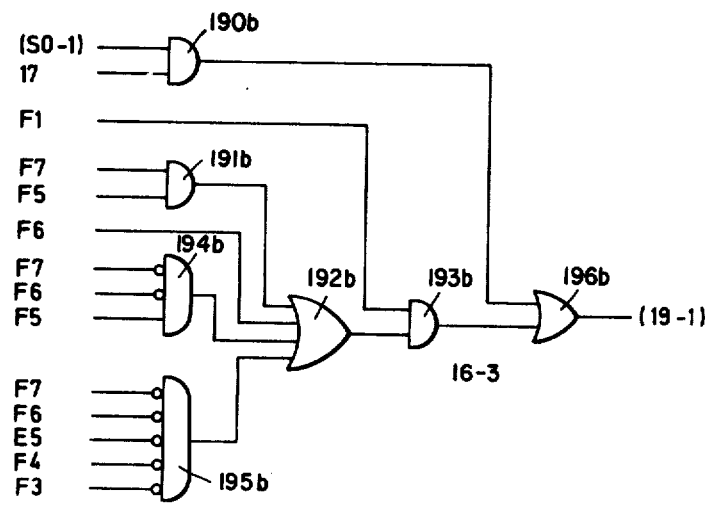

FIG. 2b shows an AND gate 190b having inputs connected to bit S0-1 and control signal 17. An AND gate 191b has a first and second input respectively connected to bits F5 and F7 and an output connected to one input of an OR gate 192b. The output of OR gate 192b is connected to one input of an AND gate 193b whose second input is connected to bit F1. An AND gate 194b has a direct input connected to bit F5 and a first and second inverting input respectively connected to bits F6 and F7. Bits F3, F4, F5, F6 and F7 are connected to inverting inputs of an AND gate 195b whose output is connected to a further input of OR gate 192b. The third and fourth inputs of OR gate 192b are connected to bit F6 and to the output of AND gate 194b respectively. The outputs of AND gate 190b and AND gate 193b are connected to respective inputs of an OR gate 196b whose output constitutes the signal on line 19-1.

Figure 2C:
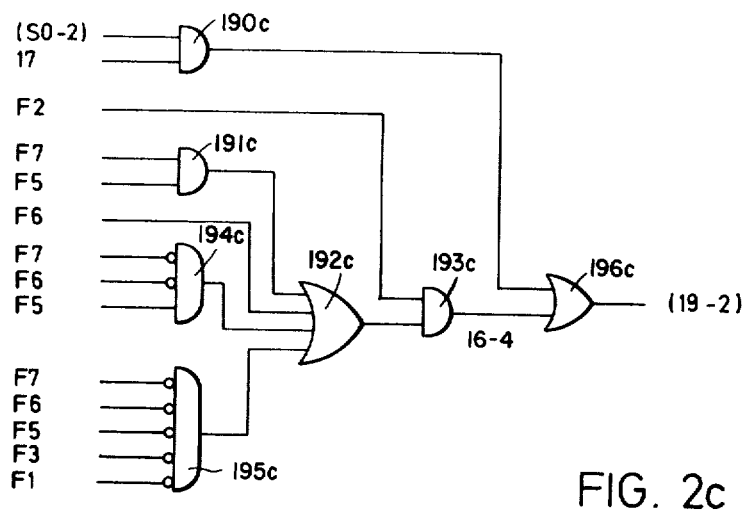

FIG. 2c shows an AND gate 190c having a first input connected to bit S0-2 and a second input connected to receive control signal 17. An AND gate 191c has inputs connected to bits F5 and F7 and an output connected to an OR gate 192c which has a further input connected to bit F6 and an output connected to an AND gate 193c which has a second input connected to bit F2. An AND gate 194c has a first and second inverting input connected to bits F6 and F7 respectively and a direct input connected to bit F5. The output of AND gate 194c is connected to a further input of OR gate 192c. Bits F1, F3, F5, F6 and F7 are all connected to inverting inputs of an AND gate 195c whose output forms the last input of OR gate 192c. The outputs of AND gates 190c and 193c are connected to respective inputs of an OR gate 196c whose output constitutes the signal on line 19-2.

Figure 2D:
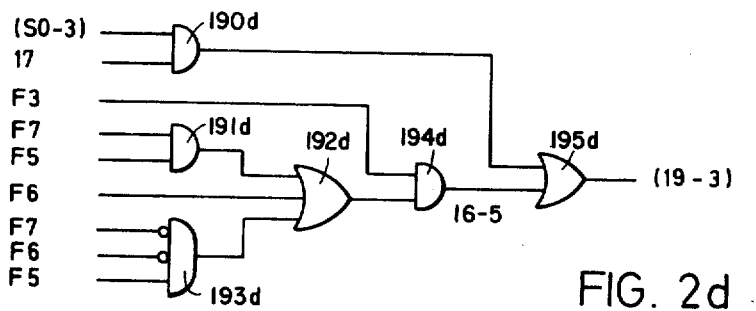

FIG. 2d has an AND gate 190d having inputs connected to bit S0-3 of memory 21 and to the output of translator 14 furnishing control signal 17. An AND gate 191d has a first and second input respectively connected to bits F5 and F7 and an output connected to an OR gate 192d which has a further direct input connected to bit F6. An AND gate 193d has inverting inputs connected to receive bits F6 and F7 respectively and a direct input connected to bit F5. The output of AND gate 193d is connected to the last input of OR gate 192d. The output of OR gate 192d is connected to one input of an AND gate 194d whose further input is connected to bit F3. The output of AND gates 190d and 194d are connected to respective inputs of an OR gate 195d whose output is the signal on line 19-3.

Figure 2E:
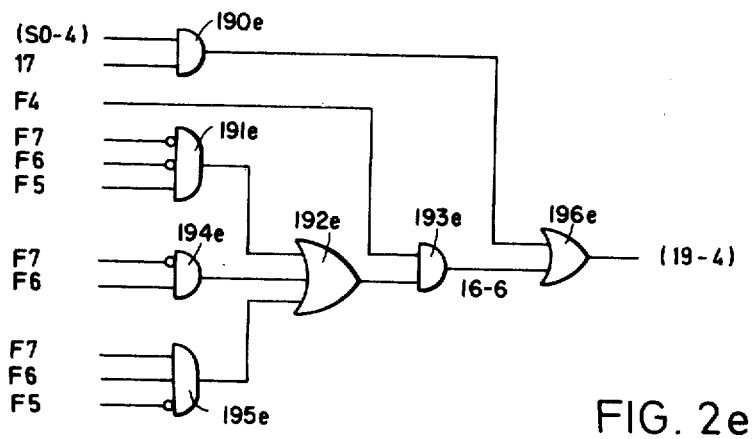

Finally FIG. 2e shows an AND gate 190e having inputs connected to receive control signal 17 and bit S0-4. An AND gate 191e has a direct input connected to bit F5 and inverting inputs connected to bits F6 and F7 respectively. The output of AND gate 191e is connected to one input of an OR gate 192e whose output is connected to the input of an AND gate 193e. The other input of AND gate 193e is directly connected to bit F4. An AND gate 194e has an inverting input connected to bit F7 and a direct input connected to bit F6. The output of AND gate 194e is connected to an input of OR gate 192e. An AND gate 195e has an inverting input connected to bit F5 and direct inputs connected to bits F6 and F7 respectively. The output of AND gate 195e forms the third input of OR gate 192e. The outputs of AND gates 190e and 193e are applied to respective inputs of an OR gate 196e whose output constitutes the signal on line 19-4. It will be noted from these figures that each address line 19-0 to 19-4 carries "0" or a "1" signal in dependence on the state of some or all of the bits in the instruction word stored in register 13. No particular address bits are singled out for furnishing the address signals. This will be discussed in further detail below. It should also be noted that a clock signal generator 200 which furnishes clock or timing signals signals synchronizing the operation of the various units of FIG. 1 to each other is shown in FIG. 2a to illustrate the generation of the CYC 2 signal. The output of clock signal generator 200 is applied to one input of an AND gate 197a'. The inputs to AND gate 197a' are the same as those to AND gate 197a except that the CYC 2 input is replaced by a clock input. The output of AND gate 197a' is connected to the input of a monostable multivibrator 201. The output of monostable multivibrator 201 is connected to a direct input of AND gate 197a' and constitutes signal CYC 2. The duration (pulse width) of signal CYC 2 is sufficient to include the next subsequent clock signal. As also shown in FIG. 2a, the control signal on line 15-1 is readily generated by applying signal CYC 2 and the clock signal to an inverting and direct input of an AND gate 202, respectively.

The circuitry showing generation of signal CYC2, while obvious to one skilled in the art, is included here for convenience.

The operand of the addressed storage location in memory 21 is then transferred via multiplexer 24, AND gate 37, register 39, and multiplexer 41 to predetermined output lines in output stage 43. It is also possible, in dependence on conditions which will be described in greater detail below, that the operand stored in memory 21 is transferred through multiplexer 24 to its output lines 34, and through AND gate 36 to page address register 38 which in turn transfers its contents through multiplexer 40 to predetermined output lines in output stage 43. A further possibility is that the output signals of multiplexer 24 are applied to multiplexers 40 and 41 directly over multiplexer 24's output lines 34. The contents of one or the other of these multiplexers can then be transferred selectively to output stage 43.

A "jump" instruction will now be discussed. A "jump" instruction is an eight bit instruction word; in a preferred embodiment 00000010. This is applied to input circuit 10 and stored in instruction word register 13. The flip-flops F0–F7 in instruction word register 13 are set in accordance with the bit pattern in the instruction word. This causes the generation of a control signal on line 15-1, and on line 15-3 and line 15-8 by logic circuits in translator 14 as well as the generation of an address signal 00010 on lines 19-0 to 19-4 as indicated by the logic circuits in FIGS. 2a–e. For a "jump" instruction, the address which must be generated at the output of stage 43 must include the page address (the address of the particular external memory from which the next instruction word is to be derived) and the address of a particular location in the selected memory, herein referred to as a line address. The signal on line 15-1 blocks AND gate 11. The next instruction word is transferred over line 26 directly into multiplexer 24, and under control of the control signals on line 15-3 and line 15-9 is transferred from multiplexer 24 into instruction count register 39. (In the absence of a signal on line 15-3 multiplexer 24 is blocked with respect to transmission of signals from lines 26 to the eight outputs of multiplexer 24. The eight bits transferred into register 39 constitute the line address. The page address is generated by decoding of the address output of multiplexer 18 by decoder 20, whereby the memory location in memory 21 which is permanently assigned to the jump instruction is addressed. The operand stored in the address is transferred through multiplexer 24 and AND gate 36 into page address register 38. Each of the registers 38 and 39 thus contains part of the address which is to be furnished by output stage 43. Multiplexers 40 and 41 are therefore controlled to transfer the contents of registers 38 and 39 to output stage 43. The signals on the sixteen output lines of output stage 43 then signify the address, including the particular memory and the location in the memory at which the next instruction word is to be found.

It must again be noted that the page address was generated as a function of the operation code portion of the "jump" instruction word. The "jump" instruction word had no actual address part. It should further be noted that the page address is found both in register 38 and in the particular memory location assigned to the "jump" instruction. The page address is always readily available in the memory so that it is not required to carry out manipulations with the page address stored in register 38.

The next instruction to be discussed is the "input" instruction which has the following bit structure: 00000100. It is again an instruction word without an address part. Again, it is stored in instruction register 13 following transfer through the input circuit 10 and AND gate 11. Translator 14 and multiplexer 18 together cause the generation of a first address word, namely the address word associated with the instruction word (00000100) as shown in detail in FIGS. 2a-2e. Decoder 20 then receives the address signals generated by multiplexer 18 via lines 19-0-19-4 and addresses the specified memory location in memory 21. The operand stored in this memory location is transferred through multiplexer 24 and AND gate 36 into page address register 38. Upon receipt of the next clock signal (CYC 2) as shown in FIG. 2a, which illustrates the generation of the least significant address bit, the operand stored in register 38 (first output register) is transferred to register 43 (output stage) and the address at the output of multiplexer 18 is changed to a second address word signifying another predetermined memory location in memory 21. In the particular example given, the second address word signifies the memory location immediately adjoining that permanently assigned to the "input" instruction. The operand stored in the so-addressed memory location is transferred through multiplexer 24 (read-out means), its output lines 34 through multiplexer 40 to output stage 43. This supplies the remaining eight bits of the required output, which is an address of an external storage location. The so-generated address is utilized to control the input of desired data stored at the so-addressed external storage location into the apparatus shown in FIG. 1. Such desired data input can take place through stage 10, lines 26, and multiplexer 25 into arithmetic-logic unit 27. The so-furnished data is then processed in the arithmetic logic unit 27. The result of the processing is transferred through multiplexer 28 into accumulator 29 where it is stored.

At this point the circuits required for identification of a particular bit will be discussed with special reference to the single bit flag circuit 31. For example, in response to a particular characteristic in the instruction word causing the data input, the latter takes place through input circuit 10 and multiplexer 25 to multiplexer 30 under control of a signal on line 15-4. Multiplexer 30 is shown in detail in FIG. 5, which also shows the logic circuits of translator 14 which generate control signals 15-6a-15-6i. The generation of control signals 15-6a-15-6h in response to bits F0, F1 and F2 of the instruction word is the same as that described with reference to the furnishing of control signals 15-7a-15-7b in FIG. 4 and will therefore not be repeated here. Eight AND gates 101a- 101h each have a first input for receiving one of the control signals 15-6a-15-6h and a second input connected to a corresponding one of the eight lines 32 coming from the output of multiplexer 28. The outputs of AND gates 101a-101h are connected to inputs of an OR gate 102. OR gate 102 also has an input connected to the output of an AND gate 103. A first input of AND gate 103 is connected to the "Carry" output of arithmetic-logic unit 27. A second input of AND gate 103 receives a further control signal 15-6i. The latter is generated in response to bits F0, F2-F7 of the instruction word as combined in three AND gates 104, 105, 106 and an OR gate 107. Examination of FIG. 5 shows that flag 31 will be set, i.e. a "1" signal will be furnished at the output of OR gate 102, if the signal on one of the lines 32 selected by the combination of flip-flops F0-F2 is a "1," (i.e. if the corresponding bit in the input data is a "1") or if there is a carry from the arithmetic-logic unit in the presence of the further control signal 15-6i. This flag signal is later used to control translator 14 to condition the next following instruction word. "Output" instruction words will be discussed next. These have the binary code 00000101 "Output" instruction words are utilized to cause the generation of a sixteen bit word at the output of stage 43. The sixteen bit word comprises the result of an operation and an address which signifies the location at which the result is to be stored. For this purpose, the "output" instruction word is entered into instruction word register 13 and, through translator 14, causes the furnishing of an address signal. The address signal is utilized to address the particular location in memory 21, which, in accordance with the present invention, is permanently assigned to stored output storage addresses. In the preferred embodiment of the present invention, this storage location in memory 21 is 00101. The operand stored in this storage location is transferred to output stage 43 through multiplexer 24, its output lines 34 and multiplexer 41. The address portion of the sixteen bit word, at the output of stage 43 has therefore been furnished. The data part of this word is read out from accumulator 29 into multiplexer 25 and from multiplexer 25 under the control of a signal on line 15-4 15-4 into multiplexer 40 and then into output stage 43. The word stored in output stage 43 is a sixteen bit word having eight bits of address and eight bits of data. It should also be remembered at this point that the present invention provides means to change at least one data bit stored in accumulator 29 prior to furnishing this data at the output of stage 43. This was described above with reference to FIG. 4.

"Indirect jump" instructions will now be discussed. This refers e.g. to instructions which cause the program to return to the main routine from various sub-routine loops and have the form 001aaaa0, where "a" indicates an address bit. The large number of address bits is required since, for indirect jumps, a large number of memory locations in memory 21 must be addressable. The "indirect jump" instruction, as stored in instruction word register 13, causes the generation of an address in translator 14. This, through decoder 20 causes the addressing of a memory location containing an operand signifying a page address. The operand is transferred to page address register 38. The memory location adjoining the first addressed memory location is addressed in the next clock pulse. The operand stored in this memory location is transferred to register 39 through multiplexer 24 and AND gate 37. This part of the address constitutes a line address for the page specified by the contents of register 38. In other words, it may be thought of as specifying a particular memory location in the memory addressed by the contents of register 38. The complete address, namely the combination of the page address in register 38 and line address in register 39, is generated by transferring the contents of the two registers in parallel to output stage 43. The next instruction word in the program can then be located.

In the above, operating conditions were described in which output words were generated by output stage 43 under control of instruction words stored in instruction word register 13. However, it is also a part of the present invention that the operand stored in the individual memory locations in memory 21 can be manipulated. This, too, is to be accomplished under the control of instruction words which utilize the principle of the present invention, namely that no particular bits in the instruction word are permanently assigned to generate either only address signals or only control signals. The operation of the equipment in manipulating the contents of memory 21 in accordance with such instruction words will now be described.

First it should be noted that in FIG. 1, a connection is indicated between the first five bits (0–4) of the S0 memory location and the input of multiplexer 18. The five lines are indicated as a single line having reference numeral 23. Referring now to FIGS. 2a–2e it will be noted that each of lines 19-0 to 19-4 at the output of address multiplexer 18 is energized if the corresponding bit in memory location S0 is energized and if control signal 17 is present (see AND gate 190a–e in FIGS. 2a–e respectively). The generation of control signal 17 is shown in FIG. 3. This figure shows a single AND gate 137 having inputs responsive to the absence of signals F1, F2, F4, F6 and F7, and the presence of signal F3, where the F letters refer to the flip-flops in instruction word register 13.

In the presence of control signal 17, as mentioned above, address multiplexer 18 furnishes an address signal at its output. This is herein referred to as an auxiliary address. This auxiliary address causes the addressing of another memory location in memory 21. The contents of the so-addressed memory location are then transferred through multiplexer 28 to accumulator 29, thereby allowing a manipulation of the operand previously stored in the addressed memory location to take place in the central processing unit. Following such manipulation, the operand is restored in the same location in memory 21 via multiplexer 25 and AND gate 44. Control signals on lines 15-2 control the restoring of the data, the correct address still being present at the output of address decoder 20.

The above-described embodiment of the present invention clearly shows the advantages of a microprocessor operating under control of a program which has instruction words of predetermined bit length, but wherein the instruction words do not have predetermined bits utilized only to generate address signals and other predetermined bits utilized only to generate control signals. Rather, in accordance with the present invention, any or all of the bits in an instruction word can, depending upon the requirements of the operation to be carried out in response to the instruction word, be utilized to generate control signals and address signals. In other words, each of the instruction words can have a few bits specifically adapted to generate an address or may have no such bits at all, particular locations in memory 21 then being permanently assigned to a particular operation. Since address words of a predetermined number of bits and control signals are required to operate the logic circuitry of the microprocessor, a translator circuit is furnished to "translate" the received instruction word into the required number of address bits and control signals. Since the use of this translator circuit greatly decreases the need for external registers for intermediate storage of addresses required by conventional multiprocessors, the amount of equipment required by the present invention is actually less than that of conventional apparatus. Further, each output word is created under control of at the most two sequential clock signals which is an improvement over the time required for processing in the conventional apparatus. Further, the instruction words have a decreased bit length since, basically $2^n$ possible output combinations are available for any instruction word of bit length n rather than the $2^{na}$ plus $2^{nc}$ (where $na+nc=n$) number of combinations available with instruction words having $n_a$ address bits and $n_c$ operation code bits. Further, since particular memory locations are permanently assigned to particular operations, the contents of the memory location can be either directly supplied to the output or supplied to the output after manipulation by the central processing unit, but in no case must they be stored in additional registers. Not only are such external registers saved, but the circuitry for addressing such registers is therefore also not required by the present invention.

The memories can be very compactly constructed in integrated circuit techniques. Since only a single memory, specifically, a random access memory, is required a great deal of space can be saved relative to apparatus which requires a number of separate registers.

Further, the present invention furnishes apparatus (i.e. circuit 31) for addressing a particular bit in a word without changing the remaining contents of accumulator 29. Thus, the possibility exits that peripheral conditions may be monitored without interrupting the programming routine. For this purpose, the flag circuit 31 is used to control translator 14 directly for effecting a conditional jump.

A microprocessor operating in accordance with the present invention can be manufactured with about 30% less space than conventional apparatus utilizing integrated circuits. Approximately twice the operating speed can be reached. External storage requirements are also decreased.

Finally, microprocessors in accordance with the present invention can be tested more readily than conventional apparatus. This is because no special registers for carrying out special instructions are required. Such registers can only be tested with very complicated programing test routines. These are not required for testing the operation of the microprocessor of the present invention.

I claim:

1. A microprocessor, comprising, in combination, input means for receiving a sequence of instruction words all having the same number of instruction word bits, at least a first selected one of said instruction words having a number of operation code bits equal in number to said number of instruction word bits and no address bits, at least a second selected one of said instruction words having a number of operation code bits less than said number of instruction word bits and an address part having the remaining number of bits; translator means connected to said input means for furnishing a predetermined number of control signals for controlling various operations within the microprocessor and at least one address word having a predetermined number of address bits in response to each of said instruction words regardless of the number of address bits in an instruction word; memory means for storing a predetermined number of operands, each in an operand memory location assigned thereto; addressing means interconnected between said translator means and said memory means for addressing a corresponding one of said operand memory locations in response to each of said address words; read-out means connected to said memory means for reading out the operand stored in said corresponding one of said operand memory locations, thereby furnishing a selected operand; and output means connected to said read-out means for furnishing output signals corresponding to said selected operand, said output signals constituting at least a first part of an output address.

2. Apparatus as set forth in claim 1, wherein said memory means has a self-address memory location storing an operand signifying the address of another of said memory locations in said memory means; wherein said translator means has translator address outputs for furnishing said address words and translator control outputs for furnishing said control signals; wherein said translator means furnishes a self-address control signal in response to a predetermined one of said instruction words; further comprising first multiplexer means having a first set of data inputs connected to said translator address outputs, a second set of data inputs connected to said self-address memory location, a control input connected to said translator means, and a set of data outputs connected to said addressing means for selectively transferring signals from said first or said second set of data inputs to said set of data outputs under control of said self-address control signal.

3. Apparatus as set forth in claim 2, wherein said predetermined one of said instruction words has no address bits.

4. Apparatus as set forth in claim 17, wherein said input means comprises input receiving means (10) for receiving each instruction word, instruction word register means (13) having outputs connected to said translator means for storing a received instruction word only in the absence of an input control signal, and first connecting means (26) for connecting the output of said input receiving means to said read-out means thereby furnishing instruction word input signals to said read-out means; and wherein said read-out means comprises logic circuit means (24) for selectively reading out said operand stored in said corresponding one of said operand memory locations or for transferring said instruction word input signals to said output means; and wherein said output means comprises a first and second output register (38, 39) connected to said read-out means and having, respectively, a number of stages corresponding to the number of bits in said stored operand and said instruction word, an output stage (43) for furnishing a plurality of output signals corresponding in number to the sum of the number of stages in said first and second output registers, and second connecting means (40, 41) for connecting said output stage to said first and second output registers; wherein said first selected instruction word constitutes a "jump" instruction; wherein said translator means furnishes jump control signals in response to said "jump" instruction, said jump control signals including said input control signal, whereby the instruction word following said "jump" instruction is blocked from said instruction word register means; and wherein said logic circuit means operate under control of said jump control signals to transfer said selected operand to said first output register and said instruction word following said "jump" instruction into said second output register; and wherein said second connecting means comprises multiplexer means connected between said first and second output register and said output stage for transferring the contents of said first and second output registers in parallel to said output stage to constitute the full address to be reached by said "jump" instruction.

5. Apparatus as set forth in claim 4, wherein said first selected one of said instruction words is an "input" instruction having no address bits; wherein said memory means has a first and second operand memory location; wherein said translator means comprises means for furnishing a first address word signifying said first operand memory location in response to said "input" instruction and a first timing signal and a second address word signifying said second input memory location in response to said instruction word and a second timing signal; wherein said read-out means comprises means for reading out the operand in said first operand memory location and transferring said operand into said first output register thereby furnishing a stored operand and means for subsequently reading out the operand in said second operand memory location thereby furnishing said selected operand; and wherein said second connecting means operates under control of control signals generated by said "input" instruction to transfer said selected operand and said storage operand to said output stage, said output stage furnishing a plurality of output signals together constituting an external address, the operand at said external address constituting desired input data for transfer to the input means of said microprocessor.

6. Apparatus as set forth in claim 5, wherein said microprocessor further comprises a central processing unit comprising an accumulator, means for transferring said desired input data from said input means to said central processing unit, arithmetic means in said central processing unit for performing mathematical operations on said desired data input thereby creating computed data, and means for applying said computed data to said accumulator for storage therein.

7. Apparatus as set forth in claim 6, wherein said translator means comprises means for generating processing control signals in response to said input instruction word; wherein said central processing unit further comprises first processing multiplexer means for receiving said desired input data and selecting a single bit therein under control of said processing control signals, and a bistable flag circuit connected to said first processing multiplexer means for furnishing a flag signal only if the so-selected bit is "0."

8. Apparatus as set forth in claim 7, wherein said translator means further has a flag input for receiving said flag signal, said translator means comprising means for furnishing selected ones of said control signals and said address words only in the presence of said flag signal.

9. Apparatus as set forth in claim 1, wherein said instruction word is an "output" instruction and wherein said output means furnishes an output word having a data part signifying a computed result and an address part signifying the address to which said computed result is to be furnished; wherein said memory means has an output memory location storing said address part of said output word; wherein said translator means furnishes the address word for addressing said output address location in response to said output instruction; wherein said read-out means comprises means for reading-out said address part of said output word, thereby furnishing a read-out address part; and wherein said translator means further comprises means for furnishing control signals for substantially simultaneously outputting said computed result stored in said accumulator and said read-out address part, in parallel, thereby furnishing said output word.

10. Apparatus as set forth in claim 9, wherein said "output" instruction comprises selector bits signifying a selected bit in said accumulator; where in said translator means comprises means (135) for furnishing a plurality of bit-identifying control signals in response to said selector bits of said "output" instruction; and wherein said central processing unit further comprises processing decoder means connected to said accumulator for receiving said bit-identifying control signals and a flag signal and controlling the state of said selected bit in dependence upon the absence or presence of said flag signal, and flag signal furnishing means connected to said processing decoder means for furnishing said flag signal.

11. Apparatus as set forth in claim 1, wherein said microprocessor further comprises a central processing unit operative under control of predetermined ones of said control signals for performing mathematical operations on input data supplied thereto, thereby furnishing processed input data; wherein said read-out means further comprises means for reading out said operand stored in said operand memory location and transferring said operand under control of other predetermined ones of said control signals to said central processing unit as said input data, whereby said central processing unit creates a processed operand in response thereto; wherein said memory means has a plurality of data inputs; further comprising transfer means for transferring said processed operand to said data inputs of said memory means under control of still other predetermined ones of said control signals while said addressing means addresses said corresponding one of said memory locations, whereby said processed operand is stored in said corresponding one of said operand memory locations.

* * * * *